US010630808B1

(12) United States Patent
Watt et al.

(10) Patent No.: US 10,630,808 B1
(45) Date of Patent: Apr. 21, 2020

(54) CONTEXTUAL ROUTING FOR DIRECTING REQUESTS TO DIFFERENT VERSIONS OF AN APPLICATION

(71) Applicant: Dell Products L.P., Round Rock, TX (US)

(72) Inventors: James S. Watt, Austin, TX (US); Rene Herrero, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 15/887,435

(22) Filed: Feb. 2, 2018

(51) Int. Cl.
*H04L 29/08* (2006.01)
*H04L 12/715* (2013.01)
*H04L 12/803* (2013.01)
*H04L 12/725* (2013.01)

(52) U.S. Cl.
CPC .......... *H04L 67/327* (2013.01); *H04L 45/306* (2013.01); *H04L 45/64* (2013.01); *H04L 47/125* (2013.01); *H04L 67/1002* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 7,155,462 B1 * | 12/2006 | Singh | .......... | G06F 8/65 717/170 |
| 7,793,157 B2 * | 9/2010 | Bailey | .......... | H04L 41/145 714/38.11 |
| 8,539,080 B1 * | 9/2013 | Uluderya | .......... | H04L 45/70 709/226 |
| 2013/0024851 A1 * | 1/2013 | Firman | .......... | G06F 8/60 717/170 |
| 2014/0067780 A1 * | 3/2014 | Lipscomb | .......... | G06Q 30/0601 707/695 |
| 2016/0234121 A1 * | 8/2016 | Zou | .......... | H04L 47/19 |

(Continued)

OTHER PUBLICATIONS

Akamai, "Audience Segmentation Cloudlet," Akamani Cloudlets Product Brief, 2015, 2 pages.

(Continued)

*Primary Examiner* — Thomas J Dailey
(74) *Attorney, Agent, or Firm* — Ryan, Mason & Lewis, LLP

(57) ABSTRACT

A method includes receiving, at a software-defined load balancer in a software-defined networking (SDN) application platform from a given one of a plurality of client devices, a request for access to a given application hosted in the SDN application platform. The method also includes obtaining, from a routing database, a set of contextual routing rules for directing requests to the given application to two or more different versions of the given application hosted in the SDN application platform. The method further includes analyzing the request to determine application context information, selecting one of the two or more different versions of the given application to serve the request utilizing the application context information and the set of contextual routing rules, and providing the given client device with access to the selected version of the given application hosted in the software-defined networking application platform in response to the request.

20 Claims, 11 Drawing Sheets

(56) References Cited

U.S. PATENT DOCUMENTS

2017/0237686 A1* 8/2017 Wang .................. H04L 29/08
709/219
2019/0158407 A1* 5/2019 Chanda .................. H04L 47/20

OTHER PUBLICATIONS

Akamai, "Phased Release Cloudlet," Akamani Cloudlets Product Brief, 2015, 2 pages.
launchdarkly.com, "Blue Green Deployments and Features Flag," launchdarkly.com/guide/bluegreendeployments.html, 2017, 2 pages.
featureflags.io, "Feature Flags, Toggles, Controls," https://featureflags.io/canary-testing/, 2017, 3 pages.
Pete Hodgson, "Feature Toggles (aka Feature Flags)," https://martinfowler.com/articles/feature-toggles.html, Oct. 9, 2017, 23 pages.
Manuel Alvarez, "Feature Toggle and Dark Releases," Akamai White Paper, Oct. 2017, 5 pages.
Opentable Tech UK Blog, "Introducing Hobknob: Feature Toggling with etcd," http://tech.toptable.co.uk/blog/2014/09/04/introducing-hobknob-feature-toggling-with-etcd/, Sep. 4, 2014, 5 pages.

* cited by examiner

CONTEXTUAL ROUTING FOR DIRECTING REQUESTS TO DIFFERENT VERSIONS OF AN APPLICATION

FIELD

The field relates generally to information processing, and more particularly routing in information processing systems.

BACKGROUND

In information processing systems, various strategies may be used for testing new products and features. In some cases, it may be desired to provide new software, or updated versions of existing software, to some users but not others for the purposes of testing or to obtain feedback. In other cases, it may be desired to enable or disable certain features of software, also referred to herein as feature toggling, for different users. It is difficult, however, to manage different versions of software and feature toggling utilizing existing technology.

SUMMARY

Illustrative embodiments of the present invention provide techniques for contextual routing. Such techniques in some embodiments advantageously permit efficient implementations of feature toggling for applications.

In one embodiment, a method comprises receiving, at a software-defined load balancer in a software-defined networking application platform from a given one of a plurality of client devices, a request for access to a given application hosted in the software-defined networking application platform. The method also comprises obtaining, from a routing database associated with the software-defined networking application platform, a set of contextual routing rules for directing requests to the given application to two or more different versions of the given application hosted in the software-defined networking application platform. The method further comprises analyzing the request to determine application context information, selecting one of the two or more different versions of the given application to serve the request utilizing the application context information and the set of contextual routing rules, and providing the given client device with access to the selected version of the given application hosted in the software-defined networking application platform in response to the request. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As described above, it can be difficult to manage different versions of software or feature toggling utilizing existing technology. Embodiments provide techniques for contextual routing, such as contextual routing of web requests, which provides various advantages for software testing, feature toggling, etc. Contextual routing in some embodiments moves the flexibility of feature toggling into an application hosting layer in a software-defined networking (SDN) environment. Intelligent web routing gateways in the SDN environment, also referred to herein as contextual gateways or contextual web routing gateways, are able to inspect and make routing decisions based on application context information. The contextual gateways are able to provide most or all functionality of feature toggling systems without the overhead imposed by in-application toggling systems.

Figure 1:
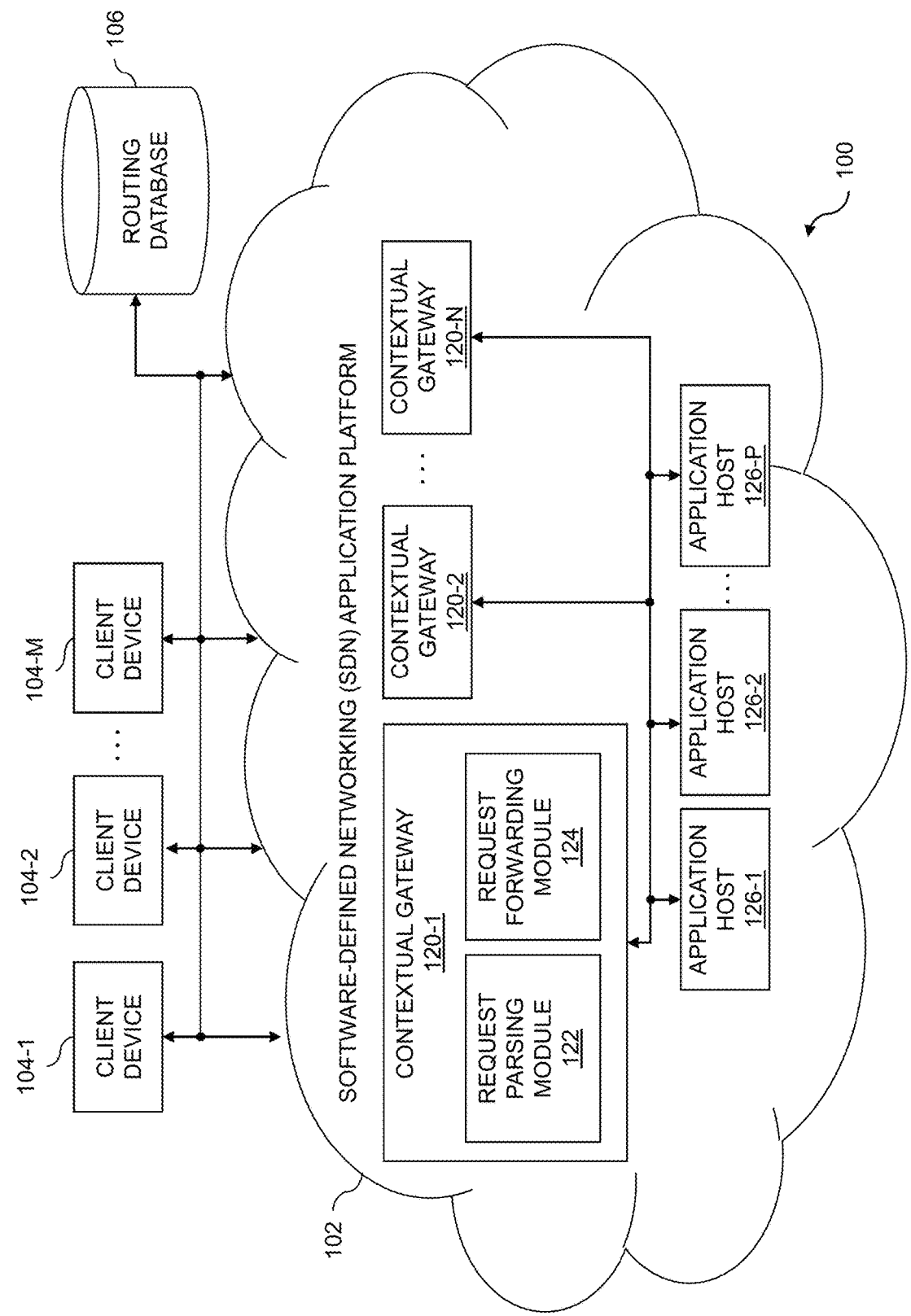
FIG. 1 is a block diagram of an information processing system for contextual routing in an illustrative embodiment of the invention.

FIG. 1 shows an information processing system 100 configured in accordance with an illustrative embodiment of the invention. The information processing system 100 comprises a SDN application platform 102 and a plurality of client devices 104-1, 104-2, . . . 104-M (collectively, client devices 104) connected thereto. Also shown is a routing database 106 coupled to the SDN application platform 102 and the client devices 104. Although not shown, the SDN application platform 102, client devices 104 and routing database 106 may be coupled to one another via one or more networks.

The client devices 104 may comprise, for example, mobile telephones, laptop computers, tablet computers, desktop computers or other types of devices, in any combination. Such devices are examples of what are more generally referred to herein as "processing devices." Some of these processing devices are also generally referred to herein as "computers."

In some embodiments, the client devices 104 are devices utilized by members of an enterprise. For example, the client devices 104 may comprise respective computers associated with a particular company, organization or other enterprise. In some embodiments, the SDN application platform 102 may be provided solely for use by members of that enterprise via the client devices 104. In other embodiments, the SDN application platform 102 may be provided for use by members of multiple different enterprises, with different subsets of the client devices 104 being used by members of such different enterprises to access the SDN application platform 102.

As mentioned above, the SDN application platform 102, client devices 104 and routing database 106 may be coupled or otherwise connected via one or more networks. The one or more networks, in some embodiments, are assumed to comprise a global computer network such as the Internet, although other types of networks may be used, including a wide area network (WAN), a local area network (LAN), a satellite network, a telephone or cable network, a cellular network, a wireless network such as a WiFi or WiMAX network, or various portions or combinations of these and other types of networks. The network connecting the SDN application platform 102, client devices 104 and routing database 106 in some embodiments therefore comprises combinations of multiple different types of networks each comprising processing devices configured to communicate using Internet Protocol (IP) or other related communication protocols.

As shown, the SDN application platform 102 includes a plurality of contextual gateways 120-1, 120-2, . . . 120-N (collectively, contextual gateways 120) coupled to a plurality of application hosts 126-1, 126-2, . . . 126-P (collectively, application hosts or applications 126). The SDN application platform 102 may include any desired number of contextual gateways 120 and application hosts 126.

The contextual gateways 120 are configured to receive requests from the client devices 104, and to make routing decisions based on application context information to select one or more of the application hosts 126 for handling the requests. For example, contextual gateway 120-1 includes a request parsing module 122 and a request forwarding module 124. The request parsing module 122 is configured to receive a request from one of the client devices 104 and to determine application context information for that request. As will be described in further detail below, in some embodiments the requests themselves may provide the application context information. For example, application context information may be obtained or derived from cookie data, header data in the requests, etc. The request forwarding module 124 is configured to determine the particular version of the requested application that is to be served to the requesting device, and to forward the request to the appropriate application host 126 based on the application context information and routing rules or policies obtained from the routing database 106. Although not shown in FIG. 1 for clarity, the contextual gateways 120-2 through 120-N may be similarly configured with request parsing and request forwarding modules.

The contextual gateways 120 may utilize information stored in the routing database 106 (e.g., routing policies) with the application context information to make routing decisions. Thus, the contextual gateways 120 may provide functionality of a feature toggling system without imposing overhead associated with in-application toggling systems. The contextual gateways 120 may be viewed as providing load balancing-as-a-service, to route requests from client devices 104 to application hosts 126 in an intelligent manner, such as based on application context information obtained or derived from the requests, on routing rules or other information stored in routing database 106, etc. The contextual gateways 120 are thus examples of software-defined load balancers.

Although FIG. 1 shows each of the contextual gateways 120 coupled to each of the application hosts 126, embodiments are not so limited. In some cases, each of the contextual gateways 120 may be coupled to a subset of the plurality of application hosts 126, so as to provide load balancing-as-a-service for its associated subset of the application hosts 126. In some cases, the contextual gateways 120 may be arranged hierarchically in two or more layers, with contextual gateways in upper layers routing requests to specific ones of the contextual gateways in a lower layer. The application hosts 126 may represent a bottommost layer of the hierarchy, or may be associated with different layers of the hierarchy. For example, a contextual gateway in an upper layer may be configured to route a request to either an application host in a lower layer or to one or more contextual gateways in the lower layer. Various other arrangements are possible.

The application hosts 126 may represent web servers, application servers, or other hosts which provide web applications or other applications or services to the client devices 104. The contextual gateways 120 of the SDN application platform 102, for example, may be used to implement a software-defined data center (SDDC) for software development or web hosting, with different application hosts 126 providing different versions of software or web services that are on-boarded by developers. An example of such a SDDC is Pivotal Cloud Foundry®. SDDCs may be Openstack®-based. The SDN application platform 102 may also or alternatively be used to implement so-called "Blue-Green" or "A/B" software testing and rollout arrangements, as will be described in further detail below. The SDN application platform 102 may further or alternatively be used to implement feature toggling. Feature toggling may be implemented at runtime by dynamically enabling or disabling features of an application using specially crafted code in the application itself. Embodiments can advantageously provide feature toggling functionality without requiring that feature toggles be coded into an application, by routing requests from client devices 104 to different ones of the application hosts 126 which provide different versions of an application having different features enabled. Further details regarding these and other use cases will be provided below in the discussion of FIGS. 3-7.

The routing database 106, as mentioned above, may store information such as routing rules or policies that may be used in conjunction with application context information to provide contextual web routing. In some embodiments, the routing database 106 may further store the application context information or portions thereof. The routing database 106 may be accessed by the contextual gateways 120 of the SDN application platform 102, as well as by one or more of the client devices 104. For example, certain authorized users may utilize one of the client devices 104 to edit the routing rules or policies stored in the routing database 106. The routing database 106 may form at least a portion of a central toggle controller as will be described in further detail below.

The routing database 106 in some embodiments is implemented using one or more storage devices associated with the system 100. Such storage devices may comprise, for example, storage products such as VNX® and Symmetrix VMAX®, both commercially available from Dell EMC Corporation of Hopkinton, Mass. A variety of other storage products may be utilized to implement at least a portion of the storage devices in the system 100.

Although not explicitly shown in FIG. 1, one or more input-output devices such as keyboards, displays or other types of input-output devices may be used to support one or more user interfaces to the SDN application platform 102, contextual gateways 120, application hosts 126, client devices 104 and routing database 106, as well as to support communication between such elements and other related systems and devices not explicitly shown.

Additional details regarding the SDN application platform 102, contextual gateways 120, application hosts 126, client devices 104 and routing database 106 will be described in further detail below with respect to FIGS. 2-7.

It is to be appreciated that the particular arrangement of the SDN application platform 102, contextual gateways 120, application hosts 126, client devices 104 and routing database 106 in the FIG. 1 embodiment is presented by way of example only, and alternative arrangements can be used in other embodiments. As discussed above, for example, in some embodiments the contextual gateways 120 and/or application hosts 126 may be arranged in a hierarchy of two or more levels. In some embodiments, the routing database 106 may be implemented at least partially internal to the SDN application platform 102 or to another system element. As another example, functionality associated with the request parsing module 122 and request forwarding module 124 may be combined into one module, or separated across more than two modules with the multiple modules possibly being implemented with multiple distinct processors.

At least portions of the request parsing module 122 and request forwarding module 124 may be implemented at least in part in the form of software that is stored in memory and executed by a processor.

It is to be understood that the particular set of elements shown in FIG. 1 for contextual routing is presented by way of illustrative example only, and in other embodiments additional or alternative elements may be used. Thus, another embodiment may include additional or alternative systems, devices and other network entities, as well as different arrangements of modules and other components.

The SDN application platform 102, contextual gateways 120, application hosts 126, client devices 104 and/or routing database 106 may be implemented at least in part using one or more processing platforms including public or private cloud infrastructure, or other distributed virtual infrastructure. Such a distributed virtual infrastructure may comprise, by way of example, a hypervisor platform and associated virtual processing and storage elements. An example of a commercially available hypervisor platform suitable for use in some embodiments is VMware® vSphere® which may have an associated virtual infrastructure management system such as the VMware® vCenter™.

Other processing platforms may be used to implement the SDN application platform 102, contextual gateways 120, application hosts 126, client devices 104 and routing database 106 in other embodiments, such as different types of virtualization infrastructure in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Figure 2:
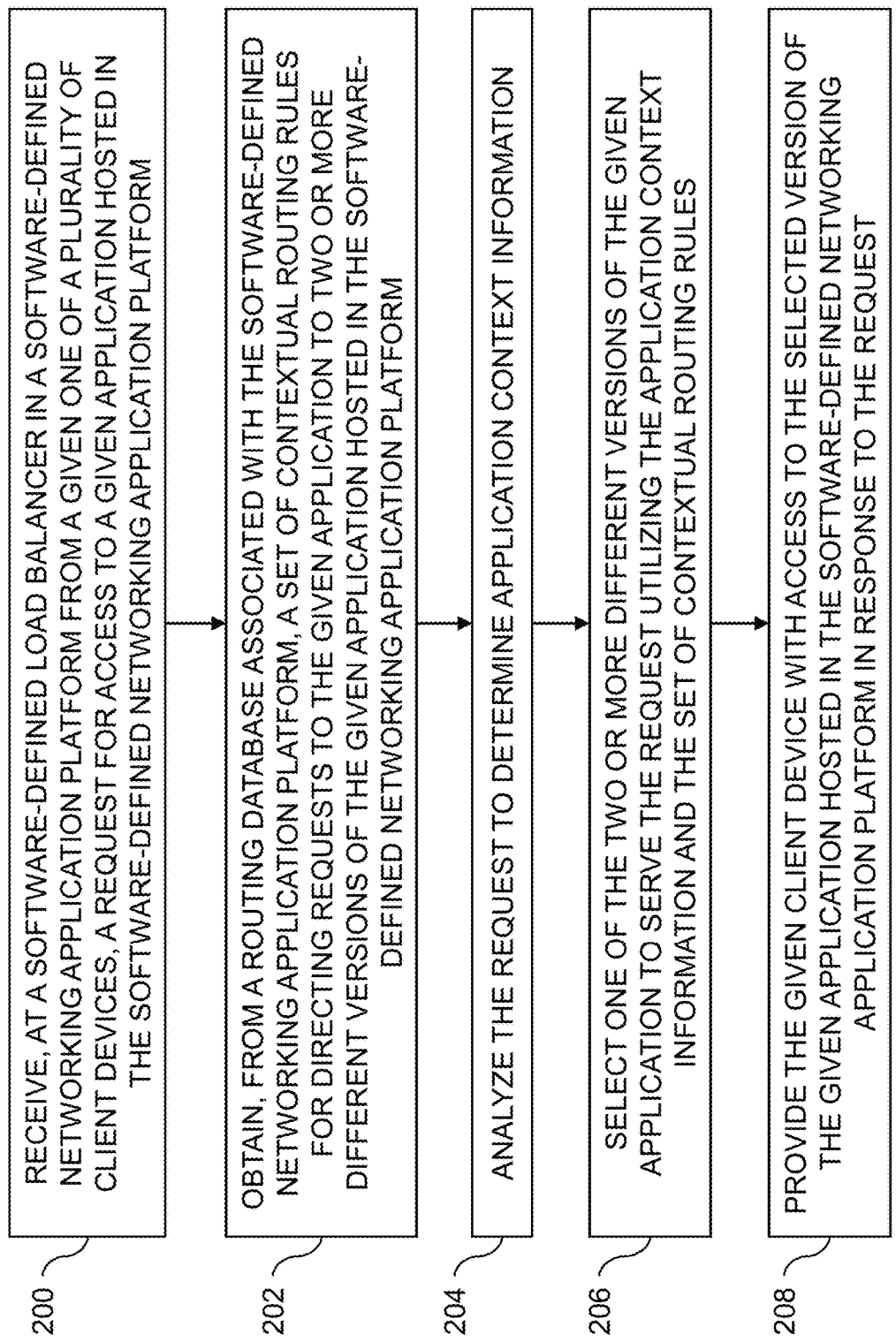
FIG. 2 is a flow diagram of an exemplary process for contextual routing in an illustrative embodiment.

An exemplary process for contextual routing will now be described in more detail with reference to the flow diagram of FIG. 2. It is to be understood that this particular process is only an example, and that additional or alternative processes for contextual routing can be carried out in other embodiments.

In this embodiment, the process includes steps 200 through 208. These steps are assumed to be performed by a processor of one or more of the contextual gateways 120. The process begins with step 200, receiving, at a software-defined load balancer (e.g., one of contextual gateways 120) in a SDN application platform such as SDN application platform 102 from a given one of a plurality of client devices (e.g., client devices 104), a request for access to a given application (e.g., one of the applications hosted by a particular one of the application hosts 126) hosted in the SDN application platform. The SDN application platform may host two or more different versions of the given application. The two or more different versions of the given application may comprise versions of the given application with different sets of features, versions of the given application providing different user experiences, versions for use and testing by different classes or groups of users, etc.

In step 202, a set of contextual routing rules for directing requests to the given application to the different versions of the given application hosted in the SDN application platform is obtained from a routing database (e.g., routing database 106). The contextual routing rules may be used to direct routing to provide customer or experience segmentation of requests for access to the given application that are received from a plurality of client devices. The contextual routing rules may also or alternatively be used to direct designated percentages of traffic to the different versions of the given application, or to direct designated types of users and/or client devices to the different versions of the given application for testing or other purposes.

The process continues with step 204, where the request received from the given client device is analyzed to determine application context information. The application context information may comprise metadata regarding a user of the given client device or attributes of the user and/or the given client device that are obtained from cookie data associated with the request and/or header data of the request. In some embodiments, the request comprises a hypertext transfer protocol (HTTP) web request comprising a header, and step 204 includes stripping the header from the HTTP web request and processing the header to obtain one or more key/value pairs.

One of the two or more different versions of the given application is selected to serve the request in step 206, utilizing the application context information and the set of contextual routing rules. In step 208, the given client device is provided with access to the selected version of the given application hosted in the software-defined networking application platform in response to the request. Step 208 may include forwarding the request of the given client device from the software-defined load balancer to an application host of the selected version of the given application in the SDN application platform.

In some embodiments, the contextual routing rules obtained in step 202 include header resolution rules for resolving header key/value pairs into route names and mapping rules for translating route names to network identifiers of hosts of the different versions of the given application in the SDN application platform. The network identifiers may comprise Internet Protocol (IP) addresses and/or hostnames for the hosts of the different versions of the given application in the SDN application platform. Step 206 may include utilizing the header resolution rules to resolve a key/value pair of a header of the request into a given route name, and utilizing the mapping rules to translate the given route name to a given network identifier of a given host of the selected version of the given application.

In some embodiments, the given application comprises one of multiple different applications hosted in the SDN application platform by a given entity, with each of the different applications having different versions thereof hosted in the SDN application platform. In such cases, the routing rules obtained in step 202 may be configured to so as to provide coordination of requests from the given client device to the multiple different applications of the given entity that are hosted in the SDN application platform, such that when an additional request for access to an additional application having different versions thereof hosted by the SDN application platform is received from the given client device, the software-defined load balancer selects a particular version of the additional application to serve the additional request based on the selected version of the given application. Such version selection coordination for the given application and the additional application may be used to provide, for example, a consistent user experience across applications hosted by the given entity in the SDN application platform.

Figure 3:
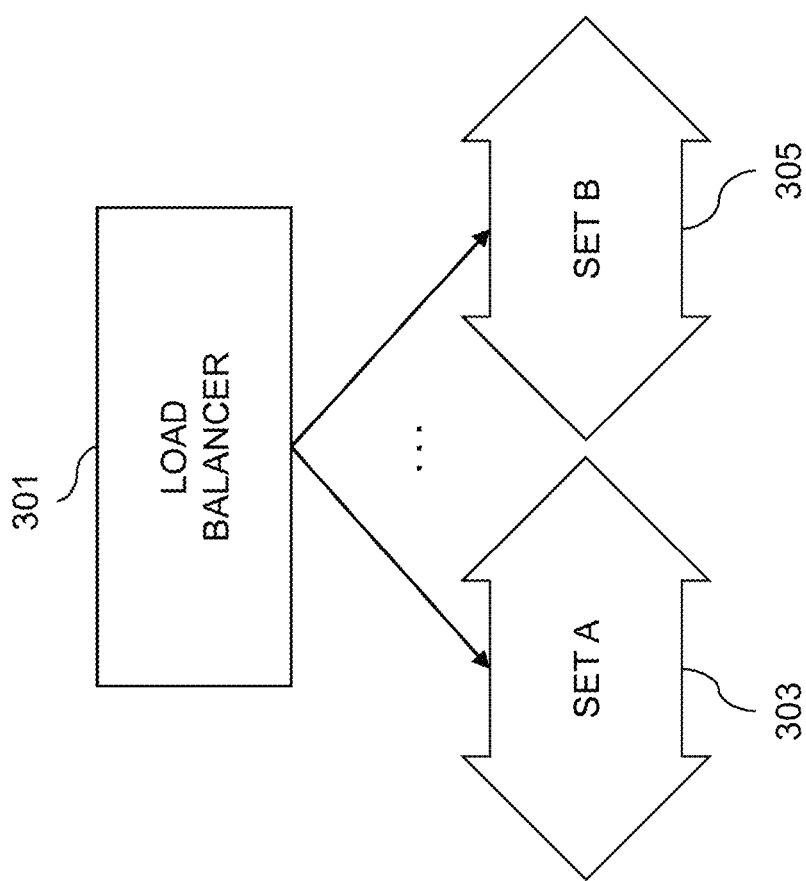
FIG. 3 is a diagram of software testing and rollout system in an illustrative embodiment.

FIG. 3 shows an example of a software testing and rollout system 300, which may be used to implement Blue-Green deployment or A/B testing functionality. Blue-Green deployments allow developers to test code in production by leveraging application hosting infrastructure to host side-by-side versions of software. Such deployments are useful in that it takes no extra work inside the application layer itself in order to perform Blue-Green testing and deployment. However, options are limited in Blue-Green deployments on which traffic is routed to the different versions of the software. A/B testing provides functionality for testing features in applications. Blue-Green deployments and A/B testing may be combined, such as using Blue-Green deployments to deploy software with new features in an application, with A/B testing of such new features. The software testing and rollout system 300 includes a load balancer 301, which can route traffic to different versions of an application or software denoted Set A 303 and Set B 305. For example, the Set A 303 may represent the "Blue" or updated software version, with the Set B 305 representing the "Green" or currently deployed software version. The load balancer 301 routes traffic to Set A 303 or Set B 305.

Figure 4:
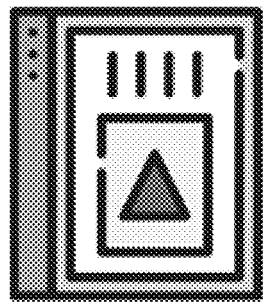
FIG. 4 is a diagram of a feature toggling system in an illustrative embodiment.

FIG. 4 illustrates a feature toggling system 400. Feature toggling functionality may be used for production test cycles, but toggles are often implemented inside the application layer itself. New application feature code can be cordoned off by feature toggle logic that is controlled remotely by a software developer or development team. Feature toggling provides benefits of allowing application context, such as the user, session, etc., to be analyzed when determining which traffic is passed to new features. Feature toggling thus allows for targeted beta testing or A/B testing for new features on top of production environment testing. This increased flexibility comes at a cost, however, as there is development overhead for implementing and maintaining feature toggles inside the application layer. The feature toggling system 400 illustrates a new feature 401, along with feature flags or toggles 403 that are set to "ON" or "OFF" to enable and disable the new feature 401 for different groups of consumers 405.

Figure 5:
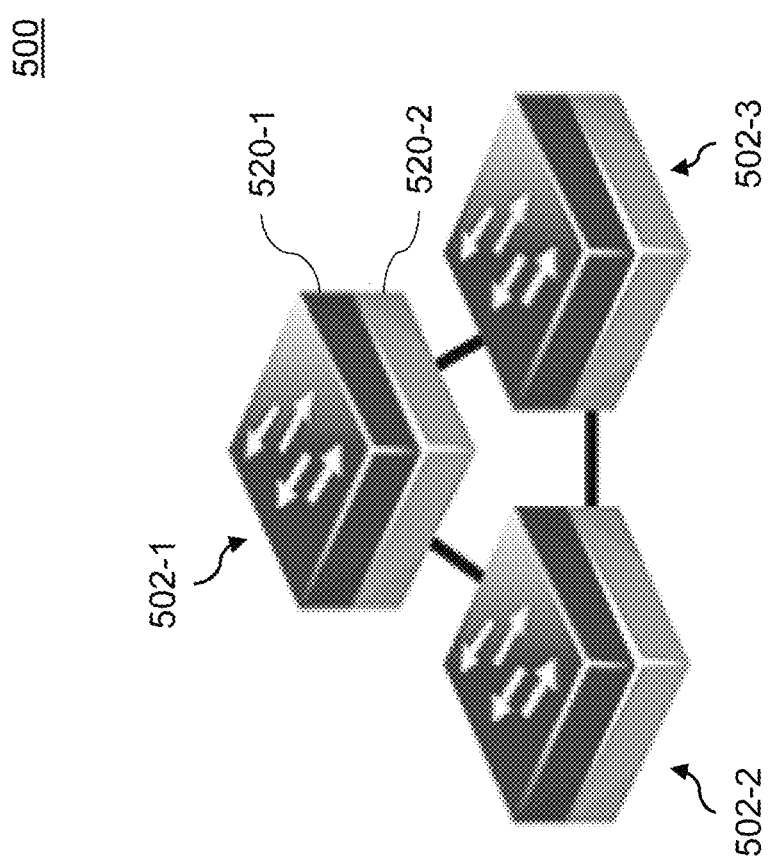
FIG. 5 is a diagram of a network arrangement with multiple switches in an illustrative embodiment.
Figure 6:
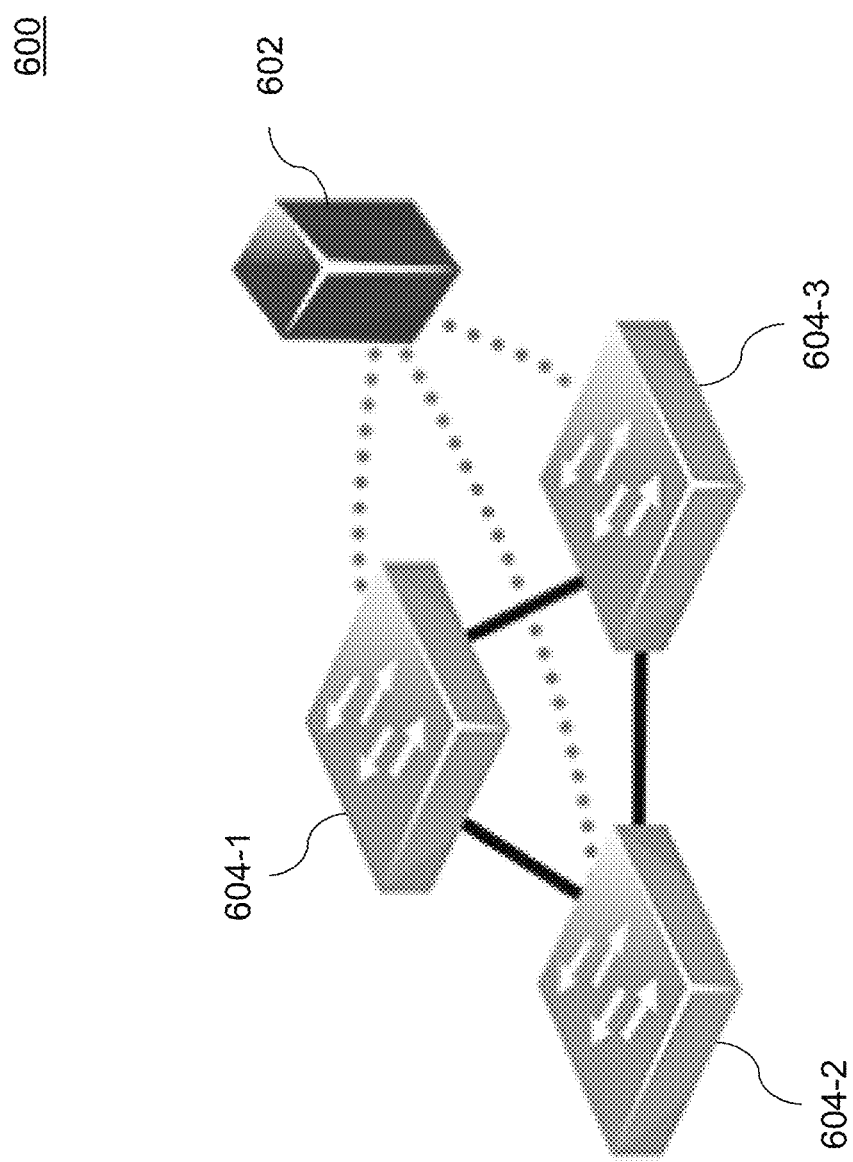
FIG. 6 is a diagram of a software-defined network in an illustrative embodiment.

FIG. 5 shows a traditional network system 500, in which there are multiple switches 502-1, 502-2 and 502-3 (collectively, switches 502). Each of the switches 502 implements a control plane 520-1 and a data plane 520-2. The control plane 520-1 provides logic for the switches 502, such as a routing table that defines how to handle incoming packets. The control plane 520-1 carries signaling traffic, while the data plane 520-2 carries user traffic. FIG. 6 illustrates a SDN system 600, including a controller machine 602 that is coupled to a number of programmable switches 604-1, 604-2, 604-3 (collectively, programmable or software-defined switches 604). The SDN system 600 provides a programmatically configurable network layer, where physical networking devices are multi-tenant and abstracted from the services utilizing them by virtual network devices (e.g., programmable switches 604). Thus, the SDN system 600 may be viewed as abstracting the control plane of traditional switches to software via the programmable switches 604, which may be controlled by a network administrator via controller machine 602.

Feature toggling capability may be provided in the code of applications themselves. Traditionally, feature toggles would be implemented by releasing a version of software code with the feature toggles, and after testing, the software code would be re-released, removing the toggles. The re-release of the software code, however, introduces overhead. In addition, each feature toggle may branch the source code, leading to overhead in the software or application. Thus, traditional feature toggling requires hosting all user experiences (e.g., all feature toggles) within the same version of an application. Once a developer decides on which features to use, a new version of the application is released with the selected user experience (e.g., replacing the feature toggles with selected features).

Embodiments advantageously push feature toggling capability to software-defined load balancers or contextual gateways. Thus, feature toggles do not need to be coded in applications themselves. Instead, multiple versions of an application may exist concurrently, each providing a different user experience, which would previously be provided by the application itself turning individual feature toggles on or off. Advantageously, selection of a particular user experience in such an arrangement does not require re-releasing a new version of the application—traffic instead is directed to the application with the desired user experience by the software-defined load balancers.

Figure 7A:
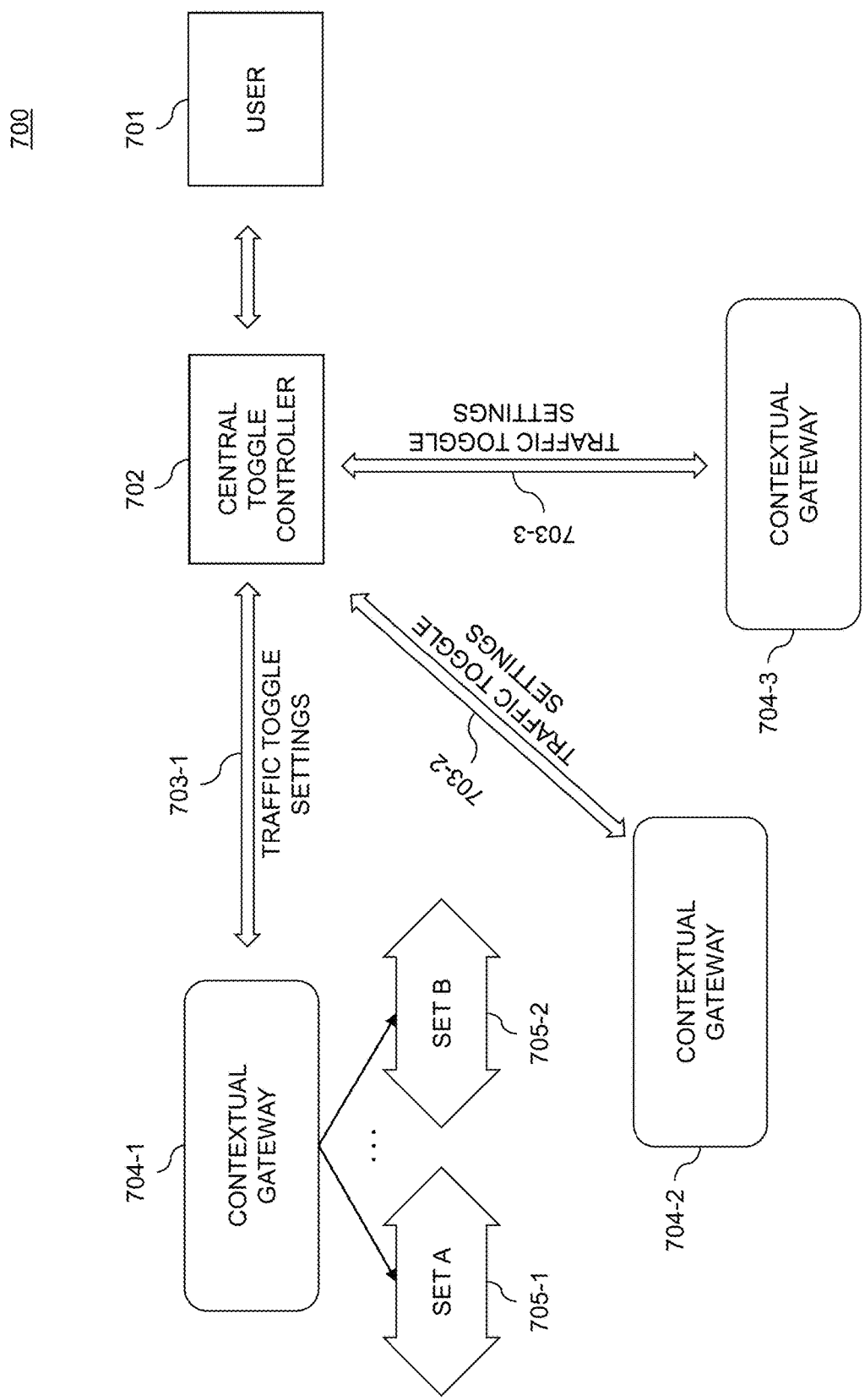
FIG. 7A is a block diagram of a contextual routing system in an illustrative embodiment.

FIG. 7A shows a contextual routing system 700 which pushes feature toggling capabilities to software-defined load balancers or contextual gateways. The contextual routing system 700 include a user 701, which interacts with a central toggle controller 702 to define routing policies for use by contextual gateways 704-1, 704-2 and 704-3 (collectively, contextual gateways 704). In some embodiments, the user 701 represents a system administrator, software developer or other authorized user permitted to define traffic toggle settings for different applications. In some embodiments, multiple users have access to the central toggle controller 702 for different applications. For example, a first user may have permissions for defining routing policies or traffic toggle settings for a first application, while a second user may have permissions for defining routing policies or traffic toggle settings for a second application. In other embodiments, one user may have permissions for defining routing policies or traffic toggle settings for multiple applications.

The user 701 in the contextual routing system 700 may represent a user of a client device (e.g., one of client devices 104 in the system 100), where the central toggle controller 702 provides the routing database 106 of the system 100.

In the contextual routing system 700, it is assumed that the contextual gateways 704 are part of a SDN application platform 740 with a number of different applications (e.g., SDN application platform 102 with application hosts 126 providing multiple different applications and versions thereof), with each of the contextual gateways 704 providing contextual routing for a different application. Thus, the contextual gateway 704-1 may provide contextual routing for a first application, with the contextual gateway 704-2 providing contextual routing for a second application and the contextual gateway 704-3 providing contextual routing for a third application. Thus, the central toggle controller 702 provides traffic toggle settings 703-1 for the first application to the contextual gateway 704-1, traffic toggle settings 703-2 for the second application to the contextual gateway 704-2, and traffic toggle settings 703-3 for the third application to the contextual gateway 704-3. Each of the contextual gateways 704 uses the traffic toggle settings provided by the central toggle controller 702 to enable feature toggling at the software-defined load balancer level, based on application context information.

Application context information may include various control points, such as cookie data and header data. The header data may include various metadata such as when an application or request was created, security features, and session context information. The metadata may further characterize the requesting device (or a user thereof), such as an identity of the user/requesting device or other attributes thereof.

For example, contextual gateway 704-1 utilizes traffic toggle settings 703-1 to determine routing of traffic between two versions of its associated application, denoted Set A 705-1 and Set B 705-2. The version of the application associated with Set A 705-1 may have a first set of features providing a first user experience, with the version of the application associated with Set B 705-2 having a second set of features providing a second user experience. Of course, it is possible for more than two versions of an application to be deployed, so as to provide more than two types of features or user experiences.

Consider a scenario in which a software developer wishes to deploy three different user experiences for a given application to users from different geographic locations, such as a first user experience for US-based customers, a second user experience for UK-based customers, and a third user experience for Brazil-based customers. The software developer (e.g., user 701) can define such traffic toggle settings in the central toggle controller 702, which in turn provides the traffic toggle settings to the contextual gateway 704 which provides routing for the given application. The contextual gateway 704 receives traffic for the given application, and utilizes application context information such as cookie data or header data in web requests, to determine the location of the user and route the user's web request to a specific version of the given application based on the user's location to provide the appropriate user experience (e.g., a version of the application with features enabled to provide the desired user experience). Such features may include the look and feel of the web site, language, formatting, etc. The user experience may also vary to account for differences in laws or regulations, etc.

It is important to note that different user experiences need not be based solely on a user's location. In other use cases, different user experiences may be provided based on other information of the source of the request (e.g., the user or requesting client device). For example, different customers of an entity may be provided with different levels of service, have different accounts or user preferences regarding features, etc.

Consider another scenario wherein a software developer is testing a new version of a given application. The given application may thus have two versions deployed, the current version of the given application and the updated version of the given application. The software developer (e.g., user 701) can define traffic toggle settings in the central toggle controller 702 to define routing policies for determining which users are directed to the new versus the current version of the given application. Such routing policies, for example, may be based on whether the user or device that is the source of a request is associated with a particular class of users (e.g., those who have signed up for beta testing, dedicated test users, etc.). The contextual gateways 704 receive traffic for the given application, and route the traffic to the appropriate version of the given application based on comparing the application context information of the user against the routing policies defined in the central toggle controller 702, which are provided to the contextual gateways 704 as traffic toggle settings 703.

Figure 7B:
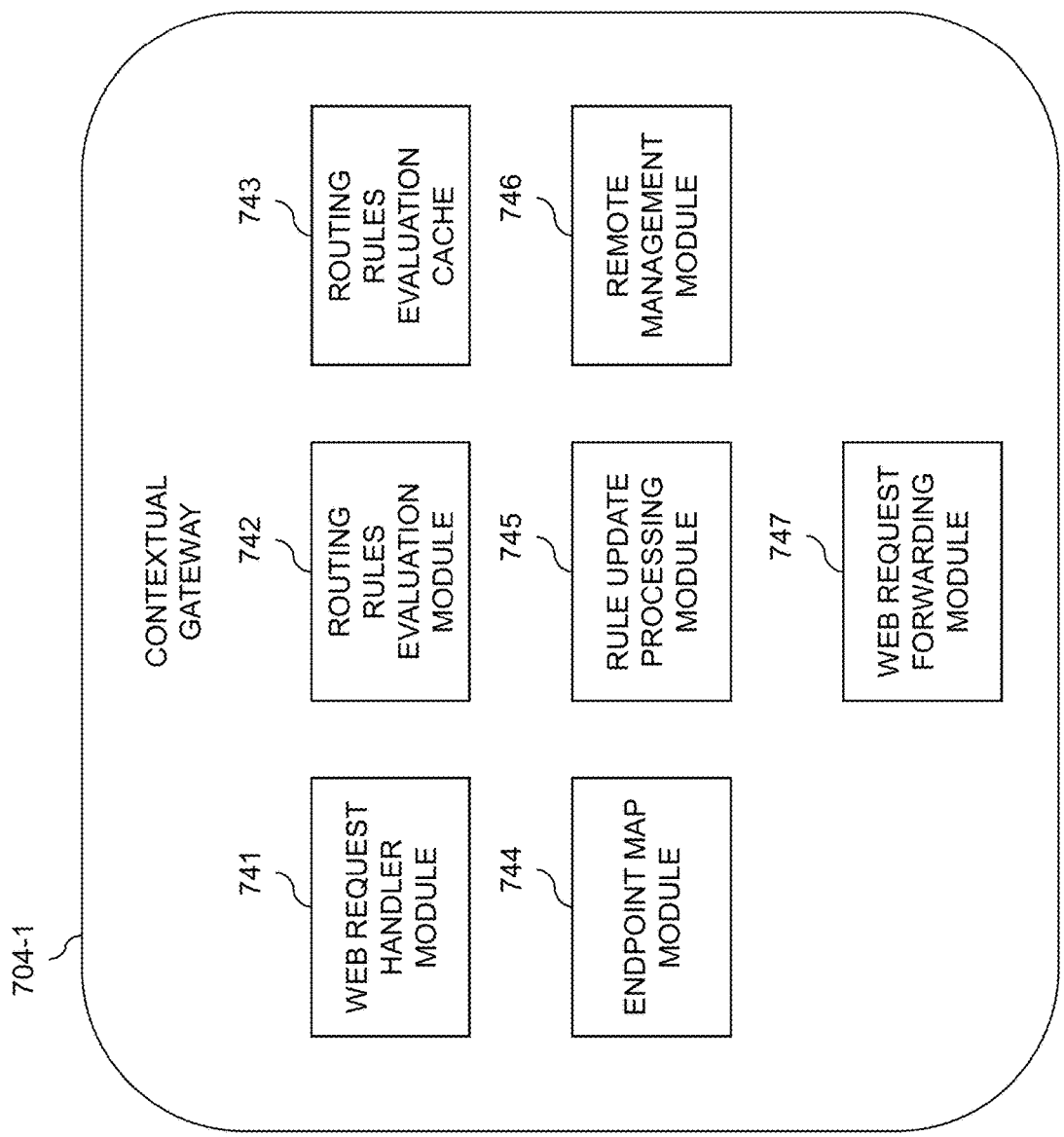
FIG. 7B is a detailed view of one of the contextual gateways in the contextual routing system of FIG. 7A in an illustrative embodiment.

FIG. 7B shows a detailed view of the contextual gateway 704-1. It is assumed that the other contextual gateways 704-2 and 704-3 are configured in a manner similar to that described below with respect to contextual gateway 704-1. The contextual gateway 704-1 includes a web request handler module 741, a routing rules evaluation module 742, a routing rules evaluation cache 743, an endpoint map module 744, a rule update processing module 745, a remote management module 746 and a web request forwarding module 747.

The web request handler module 741 is configured to process incoming web requests that are directed to applications running on a SDN application platform 740 that comprises the contextual gateways 704 and associated application hosts. The web request handler module 741 in some embodiments strips the header from a web request and processes the header to obtain one or more key/value pairs. The header of a web request such as an HTTP request, for example, may comprise a number of key/value pairs. A routing database such as routing database 106 or central toggle controller 702 contains mappings of such key/value pairs to hosts in particular environments. The user 701 can edit those mappings from a console or user interface. A given header may include the key/value pair "storename: 1234567" and the routing database defined by the user 701 may include the routing rule "For non-production environment, if (storename>10000) then route to servers hosting application versions labeled 'beta'." This routing rule would cast traffic for a particular store set to deployed servers hosting application versions with a 'beta' label.

The routing rules evaluation module 742 provides a system for resolving header key/value pairs into route names. The results of processing in the routing rules evaluation module 742 may be cached in the routing rules evaluation cache 743. For example, the route name resolved from the header key/value for a given header value may be cached in the routing rules evaluation cache 743.

The endpoint map module 744 provides a mapping of route names to hostnames, IP addresses or other identifiers for different application instances (e.g., particular servers, virtual machines, containers, etc. hosting application instances). The web request forwarding module 747 forwards the web request received by the web request handler module 741 to the IP/hostname or other identifier provided by the endpoint map module 744.

Rule update processing module 745 is configured to update routing rules that are used by the routing rules evaluation module 742 to resolve header key/value pairs into route names. The rule update processing module 745 may be configured to run in a background thread or process to fetch the latest routing rules from a remote management entity such as the central toggle controller 702. The remote management module 746 may be used to interface to the central toggle controller 702, to set locations for fetching desired routing rule sets, such as by environment, feature flag, environment or toggle settings, etc.

Figure 7C:
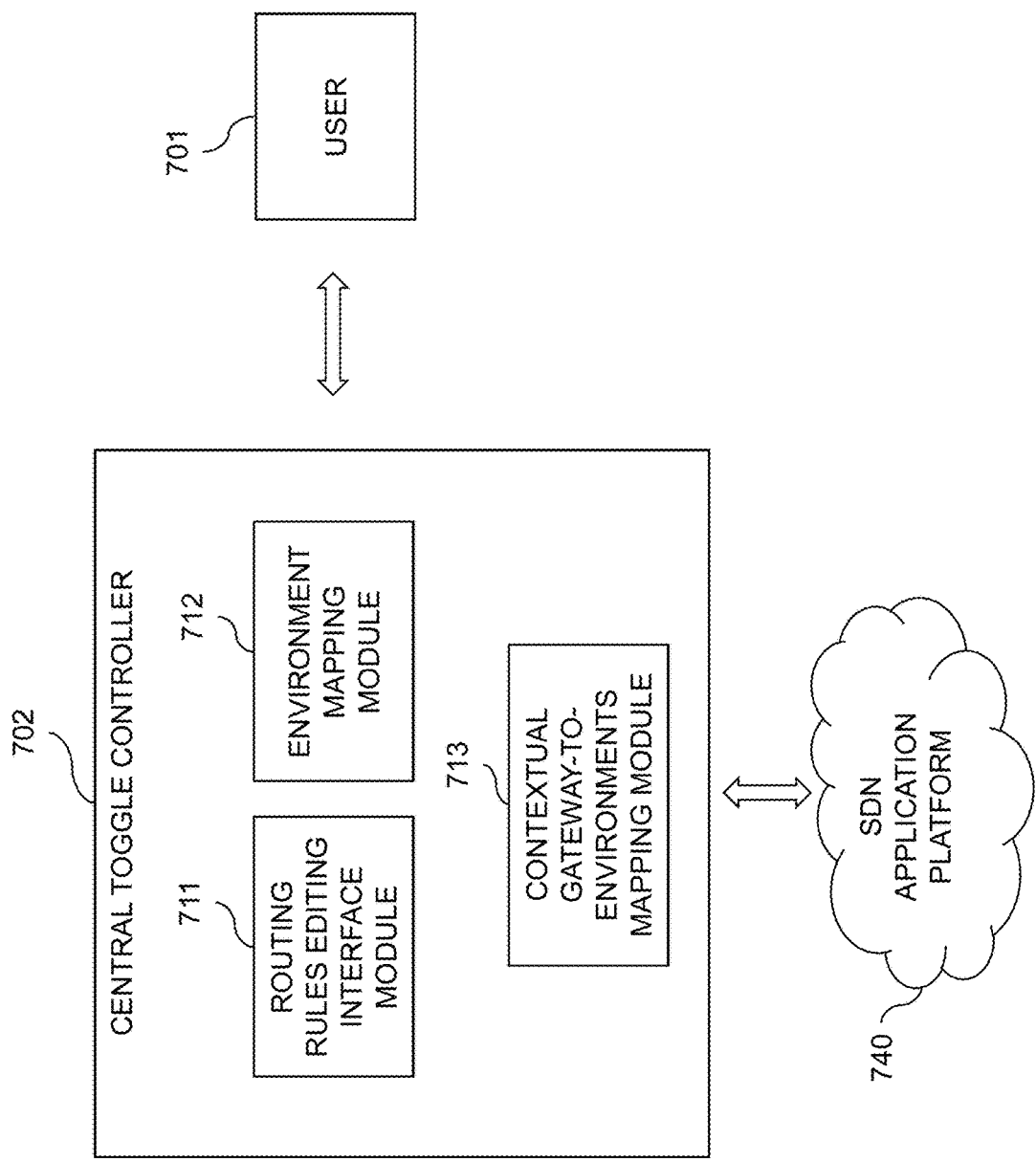
FIG. 7C is a detailed view of the central toggle controller in the contextual routing system of FIG. 7A in an illustrative embodiment.

FIG. 7C shows a detailed view of the central toggle controller 702, which comprises routing rules editing interface module 711, environment mapping module 712, and a contextual gateway-to-environments mapping module 713. As shown, the user 701 is configured to access the central toggle controller 702, such as via an interface provided by the routing rules editing interface 711, to edit routing rules (e.g., rules for resolving header key/value pairs into route names).

The central toggle controller 702 is also connected to the SDN application platform 740 which includes the contextual gateways 704 and various hosted applications. The environment mapping module 712 provides an optional interface for the user 701, giving an ability to tag routing rules with various environment flags. The contextual gateway-to-environments mapping module 713 may provide an additional optional interface, showing a listing of registered contextual gateways 704 in the SDN application platform 740, along with the rule and environment associations of the registered contextual gateways 704 in the SDN application platform 740.

The contextual gateways 704 in some embodiments are instantiated with environment labels in order to fetch a flag set from the routing database or central toggle controller 702. For example, a contextual gateway may be instantiated with an environment label such as 'non-production' in order to fetch appropriate flags set from the routing database. A production gateway could be flagged 'prod' and a non-production gateway could be flagged 'non prod' and then those values would show in the user interface of the central toggle controller 702 (e.g., in the routing rules editing interface provided by module 711) for the user 701 to specify appropriate rule sets. When servers hosting different application versions are deployed, they may be similarly labeled based on the rule sets. For example, a label can be the server name itself (e.g., route to server A) or servers can be grouped under a label (e.g., version 1.2 servers). The contextual gateways 704 are thus grouped in environments, and servers hosting different application versions would also be grouped by labels to facilitate rule specification (e.g., the above-described routing rule of "For non-production environment, if (storename>10000) then route to servers hosting application versions labeled 'beta'.").

Embodiments provide various advantages over conventional techniques. For example, techniques described herein provide finer grained environment switching, which may be used for Blue-Green deployment solutions. The fine grained environment switching may be based, for example, on percentage of traffic, customer segmentation, experience segmentation, beta experience, A/B testing, etc.

Some embodiments provide further advantages and efficiencies in that no application code changes are required to implement the contextual routing techniques described herein. In some cases, it may desired to include some coding changes to implement customer headers, but this is not a requirement. In addition, the centralized toggle control provides for dynamically discoverable and editable rule sets, providing flexibility and ease of use.

Techniques described herein may be further used for coordinated feature rollouts across an entire application platform. For example, an enterprise may offer multiple different applications. A correlation identifier may be used to branch out web requests to different experiences across the multiple different applications, providing a user with a consistent experience across the different applications offered by an enterprise.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the SDN application platform 102 and contextual gateways 120 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of information processing systems in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
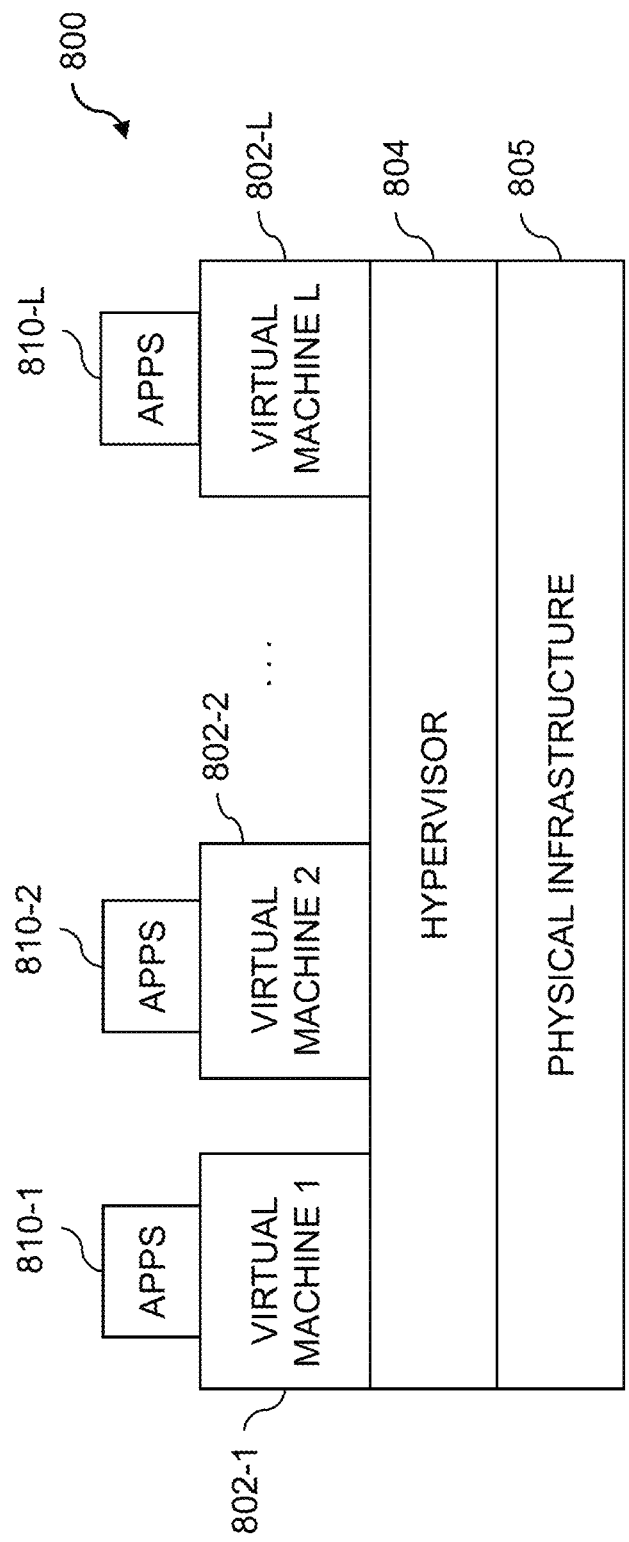
FIGS. 8 and 9 show examples of processing platforms that may be utilized to implement at least a portion of an information processing system in illustrative embodiments.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

Although only a single hypervisor 804 is shown in the embodiment of FIG. 8, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 804 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Figure 9:
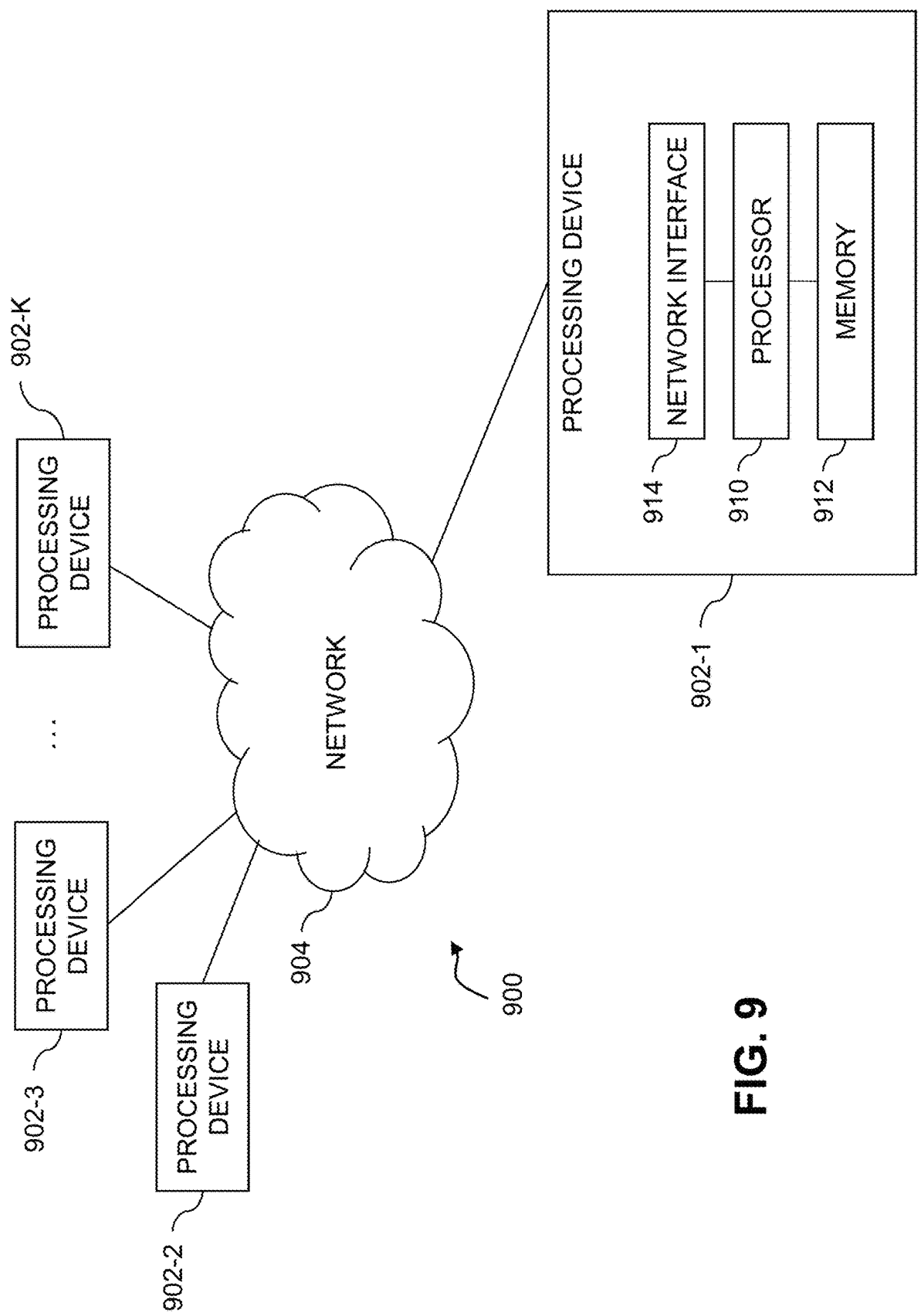

Again, the particular processing platform 900 shown in FIG. 9 is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the information processing system 100 are illustratively implemented in the form of software running on one or more processing devices.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of application context information, routing rules or policies, etc. can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
   receiving, at a software-defined load balancer in a software-defined networking application platform from a given one of a plurality of client devices, a request for access to a given application hosted in the software-defined networking application platform;
   obtaining, from a routing database associated with the software-defined networking application platform, a set of contextual routing rules for directing requests to the given application to two or more different versions of the given application hosted in the software-defined networking application platform, the two or more different versions of the given application providing two or more different feature sets;
   analyzing the request to determine application context information;
   selecting one of the two or more different versions of the given application providing a given one of the two or more different feature sets to serve the request utilizing the application context information and the set of contextual routing rules;
   providing the given client device with access to the selected version of the given application hosted in the software-defined networking application platform in response to the request;
   wherein the software-defined networking application platform hosts two or more different versions of at least one additional application providing the two or more different feature sets;
   receiving, at the software-defined load balancer, an additional request for access to the at least one additional application from the given client device; and
   selecting one of the two or more different versions of the at least one additional application to serve the additional request based at least in part on the given feature set of the selected version of the given application;
   wherein the method is performed by at least one processing device comprising a processor coupled to a memory.

2. The method of claim 1 wherein the two or more different versions of the given application comprise:
   a first version of the given application having a first set of features; and
   at least a second version of the given application having a second set of features different than the first set of features.

3. The method of claim 1 wherein the two or more different versions of the given application comprise:
   a current version of the given application for a first class of users; and
   an updated version of the given application for testing by a second class of users.

4. The method of claim 1 wherein the application context information comprises metadata regarding at least one of a user of the given client device and attributes of the given client device, the metadata being obtained from at least one of cookie data associated with the request and header data of the request.

5. The method of claim 1 wherein the contextual routing rules direct routing to provide at least one of customer segmentation and experience segmentation of requests for access to the given application from the plurality of client devices among the different versions of the given application.

6. The method of claim 1 wherein the contextual routing rules direct routing to provide designated percentages of traffic from the plurality of client devices directed to the given application to corresponding ones of the different versions of the given application.

7. The method of claim 1 wherein the contextual routing rules direct routing to provide designated types of users of the plurality of client devices to the different versions of the given application for testing the different versions of the given application.

8. The method of claim 1 wherein the request comprises a hypertext transfer protocol (HTTP) web request comprising a header, and wherein analyzing the request to determine the application context information comprises:
   stripping the header from the HTTP web request; and
   processing the header to obtain one or more key/value pairs.

9. The method of claim 8 wherein the contextual routing rules comprise:
   header resolution rules for resolving header key/value pairs into route names; and
   mapping rules for translating route names to network identifiers of hosts of the different versions of the given application in the software-defined networking application platform.

10. The method of claim 9 wherein the network identifiers comprise at least one of Internet Protocol (IP) addresses and hostnames for the hosts of the different versions of the given application in the software-defined networking application platform.

11. The method of claim 9 wherein selecting between the two or more different versions of the given application to serve the request comprises:
    utilizing the header resolution rules to resolve the one or more key/value pairs of the header of the request into a given route name; and
    utilizing the mapping rules to translate the given route name to a given network identifier of a given host of the selected version of the given application.

12. A computer program product comprising a non-transitory processor-readable storage medium having stored therein program code of one or more software programs, wherein the program code when executed by at least one processing device causes the at least one processing device:
    to receive, at a software-defined load balancer in a software-defined networking application platform from a given one of a plurality of client devices, a request for access to a given application hosted in the software-defined networking application platform;
    to obtain, from a routing database associated with the software-defined networking application platform, a set of contextual routing rules for directing requests to the given application to two or more different versions of the given application hosted in the software-defined networking application platform, the two or more different versions of the given application providing two or more different feature sets;

to analyze the request to determine application context information;

to select one of the two or more different versions of the given application providing a given one of the two or more different feature sets to serve the request utilizing the application context information and the set of contextual routing rules;

to provide the given client device with access to the selected version of the given application hosted in the software-defined networking application platform in response to the request;

wherein the software-defined networking application platform hosts two or more different versions of at least one additional application providing the two or more different feature sets;

to receive, at the software-defined load balancer, an additional request for access to the at least one additional application from the given client device; and to select one of the two or more different versions of the at least one additional application to serve the additional request based at least in part on the given feature set of the selected version of the given application.

13. The computer program product of claim 12 wherein the request comprises a hypertext transfer protocol (HTTP) web request comprising a header, and wherein analyzing the request to determine the application context information comprises:
stripping the header from the HTTP web request; and
processing the header to obtain one or more key/value pairs.

14. The computer program product of claim 13 wherein the contextual routing rules comprise header resolution rules for resolving header key/value pairs into route names and mapping rules for translating route names to network identifiers of hosts of the different versions of the given application in the software-defined networking application platform, and wherein selecting between the two or more different version of the given application to serve the request comprises:
utilizing the header resolution rules to resolve the one or more key/value pairs of the header of the request into a given route name; and
utilizing the mapping rules to translate the given route name to a given network identifier of a given host of the selected version of the given application.

15. An apparatus comprising:
at least one processing device comprising a processor coupled to a memory;
the at least one processing device being configured:
to receive, at a software-defined load balancer in a software-defined networking application platform from a given one of a plurality of client devices, a request for access to a given application hosted in the software-defined networking application platform;
to obtain, from a routing database associated with the software-defined networking application platform, a set of contextual routing rules for directing requests to the given application to two or more different versions of the given application hosted in the software-defined networking application platform, the two or more different versions of the given application providing two or more different feature sets;

to analyze the request to determine application context information;

to select one of the two or more different versions of the given application providing a given one of the two or more different feature sets to serve the request utilizing the application context information and the set of contextual routing rules;

to provide the given client device with access to the selected version of the given application hosted in the software-defined networking application platform in response to the request;

wherein the software-defined networking application platform hosts two or more different versions of at least one additional application providing the two or more different feature sets;

to receive, at the software-defined load balancer, an additional request for access to the at least one additional application from the given client device; and to select one of the two or more different versions of the at least one additional application to serve the additional request based at least in part on the given feature set of the selected version of the given application.

16. The apparatus of claim 15 wherein the request comprises a hypertext transfer protocol (HTTP) web request comprising a header, and wherein analyzing the request to determine the application context information comprises:
stripping the header from the HTTP web request; and
processing the header to obtain one or more key/value pairs.

17. The apparatus of claim 16 wherein the contextual routing rules comprise header resolution rules for resolving header key/value pairs into route names and mapping rules for translating route names to network identifiers of hosts of the different versions of the given application in the software-defined networking application platform, and wherein selecting between the two or more different version of the given application to serve the request comprises:
utilizing the header resolution rules to resolve the one or more key/value pairs of the header of the request into a given route name; and
utilizing the mapping rules to translate the given route name to a given network identifier of a given host of the selected version of the given application.

18. The method of claim 1 wherein the selected version of the at least one additional application provides a same one of the two or more different feature sets as the selected version of the given application.

19. The method of claim 1 wherein the two or more different feature sets are associated with two or more different user experiences, the two or more different user experiences comprising at least one of:
two or more different languages;
two or more different types of formatting; and
two or more different types of look and feel.

20. The method of claim 1 wherein the given feature set of the selected version of the given application is based at least in part on one or more of:
a location of the given client device;
a level of service of a user of the given client device; and
one or more preferences of the user of the given client device.

* * * * *